US007786628B2

United States Patent
Childe et al.

(10) Patent No.: US 7,786,628 B2
(45) Date of Patent: Aug. 31, 2010

(54) ROTOR ASSEMBLY WITH BALANCING MEMBER

(75) Inventors: Matthew John Childe, Melksham (GB); Peter Lee Crossley, Auckland (NZ)

(73) Assignee: Dyson Technology Limited, Wiltshire (GB)

(*) Notice: Subject to any disclaimer, the term of this patent is extended or adjusted under 35 U.S.C. 154(b) by 498 days.

(21) Appl. No.: 10/572,053

(22) PCT Filed: Sep. 17, 2004

(86) PCT No.: PCT/GB2004/004002

§ 371 (c)(1),
(2), (4) Date: Dec. 6, 2006

(87) PCT Pub. No.: WO2005/029687

PCT Pub. Date: Mar. 31, 2005

(65) Prior Publication Data

US 2007/0194637 A1 Aug. 23, 2007

(30) Foreign Application Priority Data

Sep. 19, 2003 (GB) ................... 0321951.6
Sep. 30, 2003 (GB) ................... 0322842.6

(51) Int. Cl.
*H02K 11/00* (2006.01)
(52) U.S. Cl. ............... 310/51; 310/68 B; 310/68 C; 310/68 D
(58) Field of Classification Search ........... 310/51, 310/68 B, 68 C, 68 D
See application file for complete search history.

(56) References Cited

U.S. PATENT DOCUMENTS

| 2,558,737 A | * | 7/1951 | Darnell .................. 310/51 |
| 4,419,894 A | | 12/1983 | Matumoto |
| 4,884,406 A | * | 12/1989 | Kawamura ............. 60/605.3 |
| 4,969,797 A | | 11/1990 | Takara et al. |
| 5,604,388 A | * | 2/1997 | Baker et al. ............. 310/51 |

(Continued)

FOREIGN PATENT DOCUMENTS

EP 0668652 A1 * 8/1995

(Continued)

OTHER PUBLICATIONS

International Search Report directed to PCT/GB2004/004002.

(Continued)

*Primary Examiner*—Quyen Leung
*Assistant Examiner*—Terrance Kenerly
(74) *Attorney, Agent, or Firm*—Morrison & Foerster LLP

(57) ABSTRACT

A rotor assembly for an electronic machine such as a motor includes a rotor on a shaft having a bearing at each end portion, the bearings being arranged to rotatably support the rotor and shaft. The assembly further includes a balancing member, from which material may be removed for balancing the rotor assembly. The balancing member is located in a predetermined position and orientation with respect to the rotor. The balancing member includes an encoder disk, arranged to permit positioning of the rotor with respect to a stator. The provision of a balancing member having an integral encoder disk facilitates the manufacture of the rotor assembly. As the balancing member is located in a predetermined position, the encoder automatically assumes a predetermined position and hence the position of the rotor can be determined with certainty.

18 Claims, 5 Drawing Sheets

U.S. PATENT DOCUMENTS

| | | | |
|---|---|---|---|
| 5,780,945 A | | 7/1998 | Caviglia et al. |
| 5,811,901 A | * | 9/1998 | Nagai et al. .................... 310/80 |
| 5,831,358 A | * | 11/1998 | Bobay ......................... 310/58 |
| 5,898,246 A | * | 4/1999 | Hoffman .................. 310/60 R |
| 6,351,043 B1 | | 2/2002 | Wolf et al. |
| 6,359,401 B1 | | 3/2002 | Garcia-Sinclair et al. |
| 6,608,483 B1 | * | 8/2003 | Hill ............................. 324/458 |
| 2001/0020882 A1 | * | 9/2001 | Heinrich ..................... 335/296 |
| 2003/0057903 A1 | * | 3/2003 | Desbiolles et al. .......... 318/254 |
| 2003/0127921 A1 | * | 7/2003 | Akutsu et al. ............. 310/68 R |
| 2004/0070391 A1 | * | 4/2004 | Muszynski ............ 324/207.22 |

FOREIGN PATENT DOCUMENTS

| | | |
|---|---|---|
| EP | 0905862 A2 | 3/1999 |
| EP | 0911537 A1 | 4/1999 |
| EP | 0911537 A1 * | 4/1999 |
| JP | 63-153769 | 10/1988 |
| JP | 4340353 | 11/1992 |
| JP | 7115761 | 5/1995 |
| JP | 2003-9492 | 1/2003 |
| JP | 2003-134737 | 5/2003 |

OTHER PUBLICATIONS

GB Search Report directed to GB Application No. 0322842.6.

* cited by examiner

ROTOR ASSEMBLY WITH BALANCING MEMBER

FIELD OF THE INVENTION

This invention relates to a rotor assembly for an electrical machine such as an electrical motor or generator.

BACKGROUND OF THE INVENTION

Electrical motors are widely used for many different applications and are commonly used in domestic appliances. For example, in a vacuum cleaner a motor is used to drive a fan that causes dirty air to be sucked through a dirty air inlet. The dirty air passes through some form of separation device such as a cyclonic or bag separator that separates dirt and dust from the airflow, and finally the air is exhausted from an air outlet.

Switched reluctance machines have become increasingly popular in recent years. In a switched reluctance motor, a stator has sets of poles that are sequentially energised to rotate a rotor into line with the energised pair of poles, under the influence of the magnetic fields associated with each set of poles. By rapidly switching between different pairs of poles, it is possible to cause the rotor to rotate at a very high speed.

Switched reluctance machines have an advantage in that they do not use carbon brushes, which need to be replaced periodically and which emit particles of carbon into the atmosphere as they wear down. Furthermore, the motor has a relatively long life and its speed is not limited by the need to maintain a reasonable brush life.

In order to energise sequentially the stator poles, the position of the rotor with respect to the stator poles has to be determined with great accuracy. It has been proposed to use an encoder disk mounted on the shaft. The encoder is arranged, in use, to rotate with the shaft and interrupt intermittently light travelling between a transmitter and a detector. Thus, during manufacture, the encoder has to be mounted carefully on the shaft in a predetermined position and orientation with respect to the rotor so that the rotational position of the rotor can be determined. Alternatively, the encoder can be mounted on the shaft in an arbitrary orientation, which then must be determined with respect to the rotor before use.

SUMMARY OF THE INVENTION

The invention provides a rotor assembly comprising a shaft carrying a rotor and a balancing member from which material is selectively removable, the balancing member being located in a predetermined position with respect to the rotor, wherein the balancing member further comprises an encoder member.

The provision of a balancing member having an integral encoder member greatly simplifies the manufacture and set-up of the rotor assembly. The balancing member is located in a predetermined position with respect to the rotor; hence the integral encoder member is also located in a known position and orientation with respect to the rotor.

Preferably, locating means is provided in the form of a lug located between adjacent poles of the rotor. This facilitates the locating of the balancing member in the predetermined position.

Advantageously, the integral encoder member comprises a disk having at least one aperture, otherwise known as a chopper.

The balancing member may comprise a main body and a sleeve, with the encoder member being located on the sleeve. Thus, a predetermined distance between the main body and the encoder is maintained.

The invention is applicable to switched reluctance machines, and is particularly useful in such machines that operate at high speeds of, say, 100,000 revolutions per minute.

While the following embodiments describe the invention as applied to motors which are used to drive a fan in a vacuum cleaner, it will be appreciated that the invention can be applied to both motors and generators, for any type of application, and is not limited to vacuum cleaners or the field of domestic appliances.

BRIEF DESCRIPTION OF THE DRAWINGS

The invention will now be described, by way of example, with reference to the accompanying drawings, in which.

DETAILED DESCRIPTION OF THE INVENTION

Figure 1:
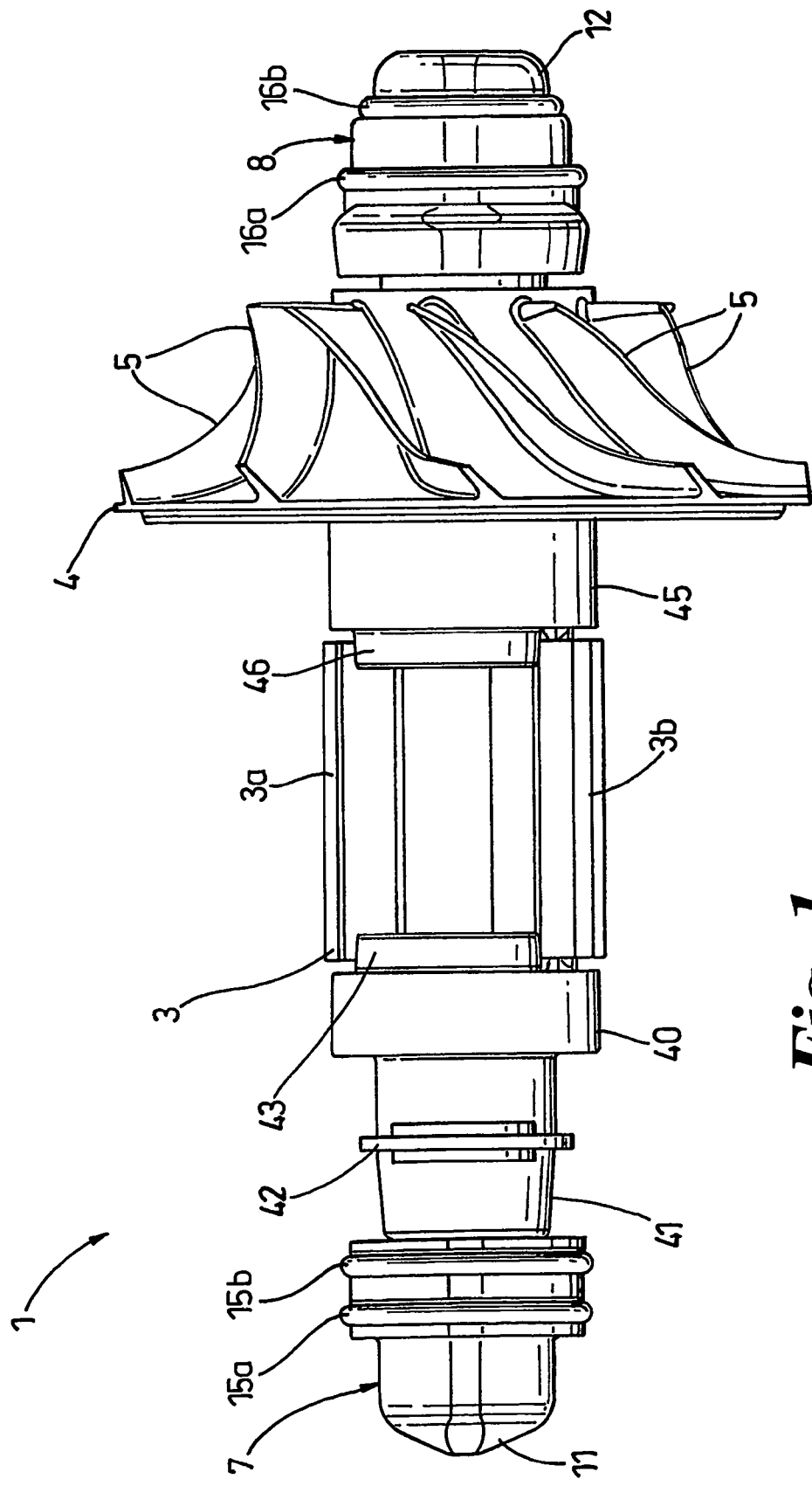
FIG. 1 shows a rotor assembly constructed in accordance with the invention.
Figure 2:
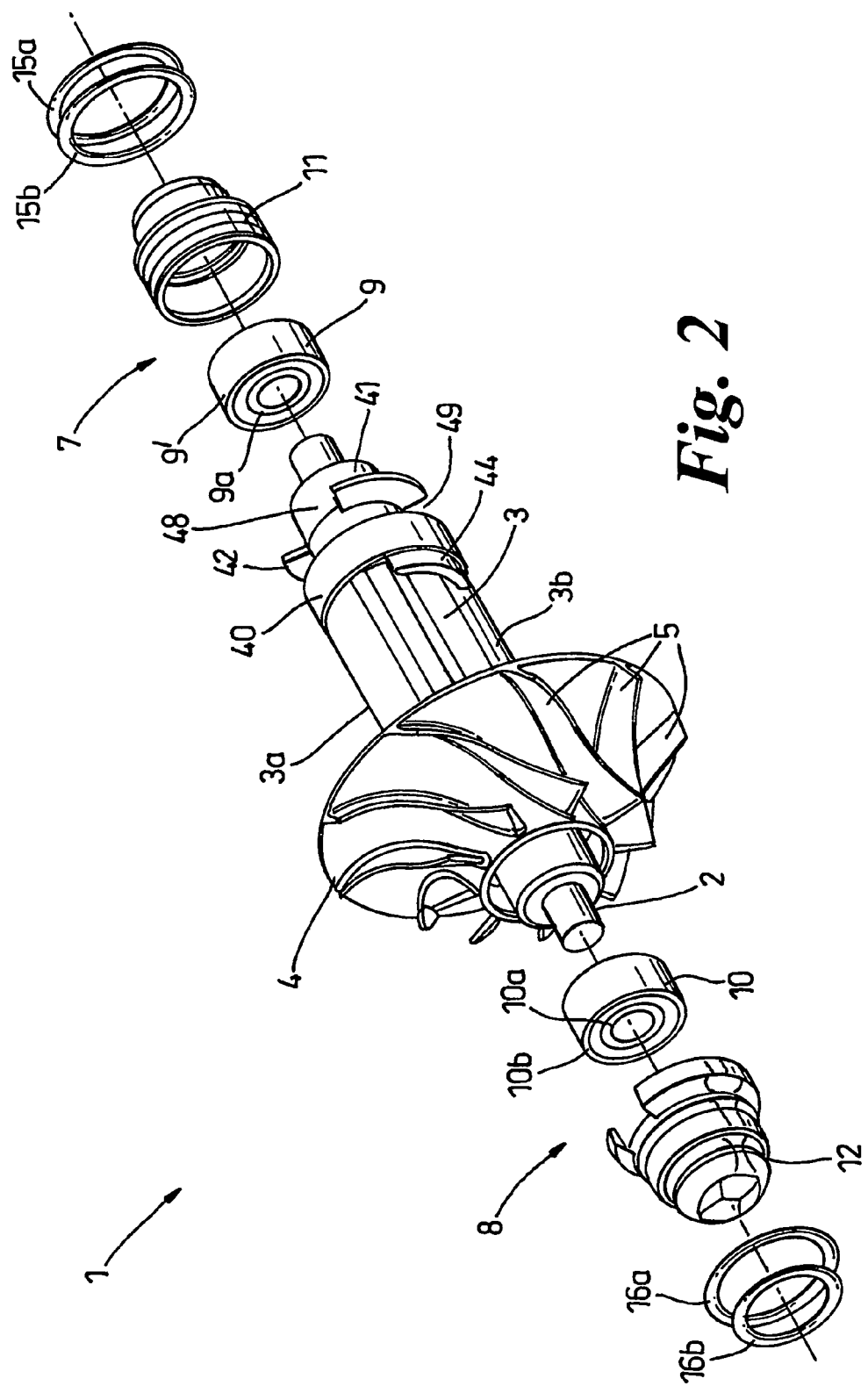
FIG. 2 is an exploded view of the rotor assembly of FIG. 1.
Figure 3:
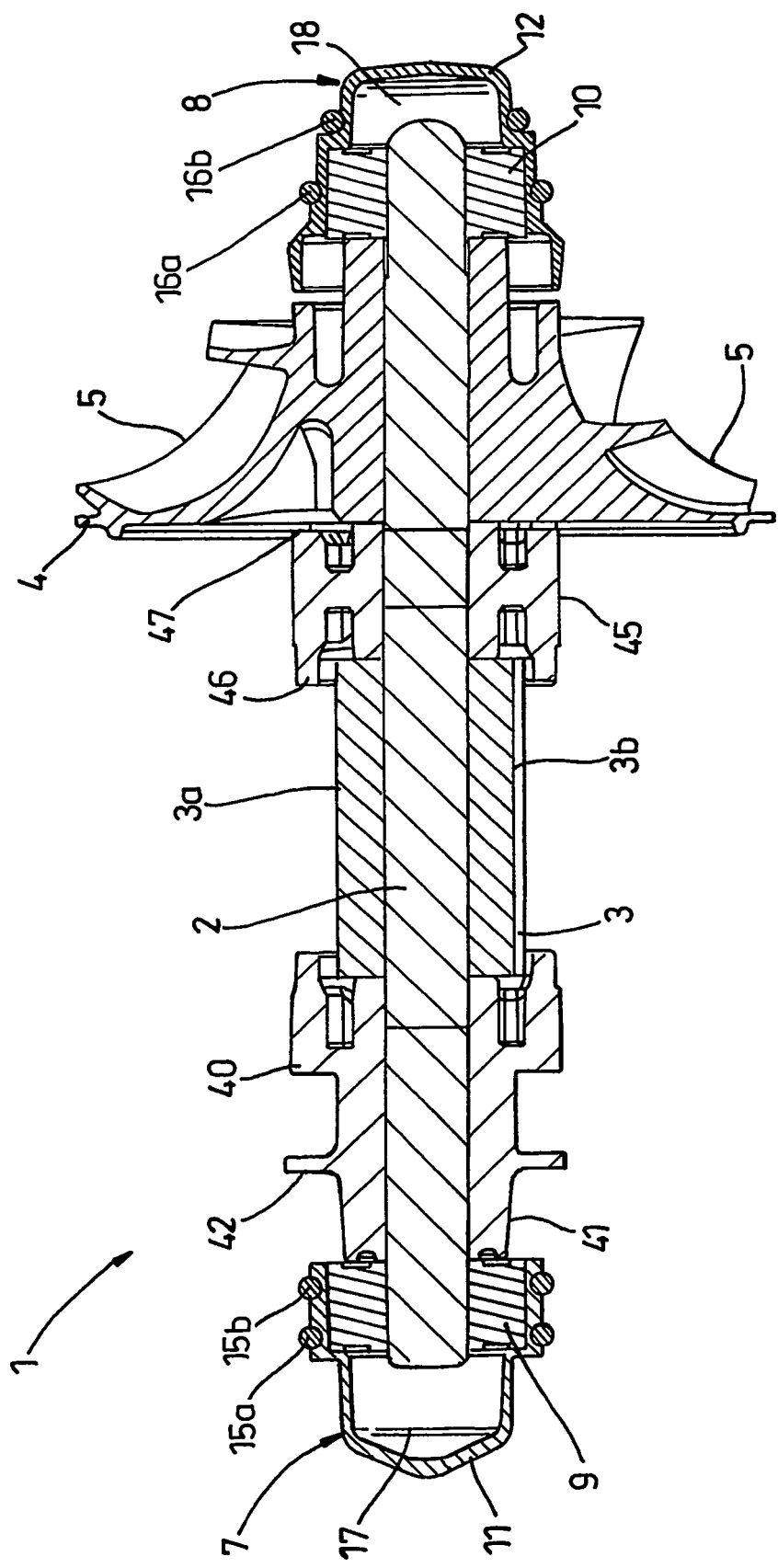
FIG. 3 is a sectional view of the rotor assembly of FIGS. 1 and 2.

FIGS. 1 to 3 show a rotor assembly constructed according to the invention and indicated generally by the reference numeral 1. The rotor assembly 1 comprises a rotor shaft 2 having a rotor member 3. The rotor member 3 comprises an axially laminated stack of steel plates, arranged to form a pair of poles 3a, 3b. The shaft 2 also carries a coaxial impeller 4 having a plurality of blades 5 arranged to direct fluid flow from the shaft 2 to the periphery of the impeller in tangential directions.

Figure 4:
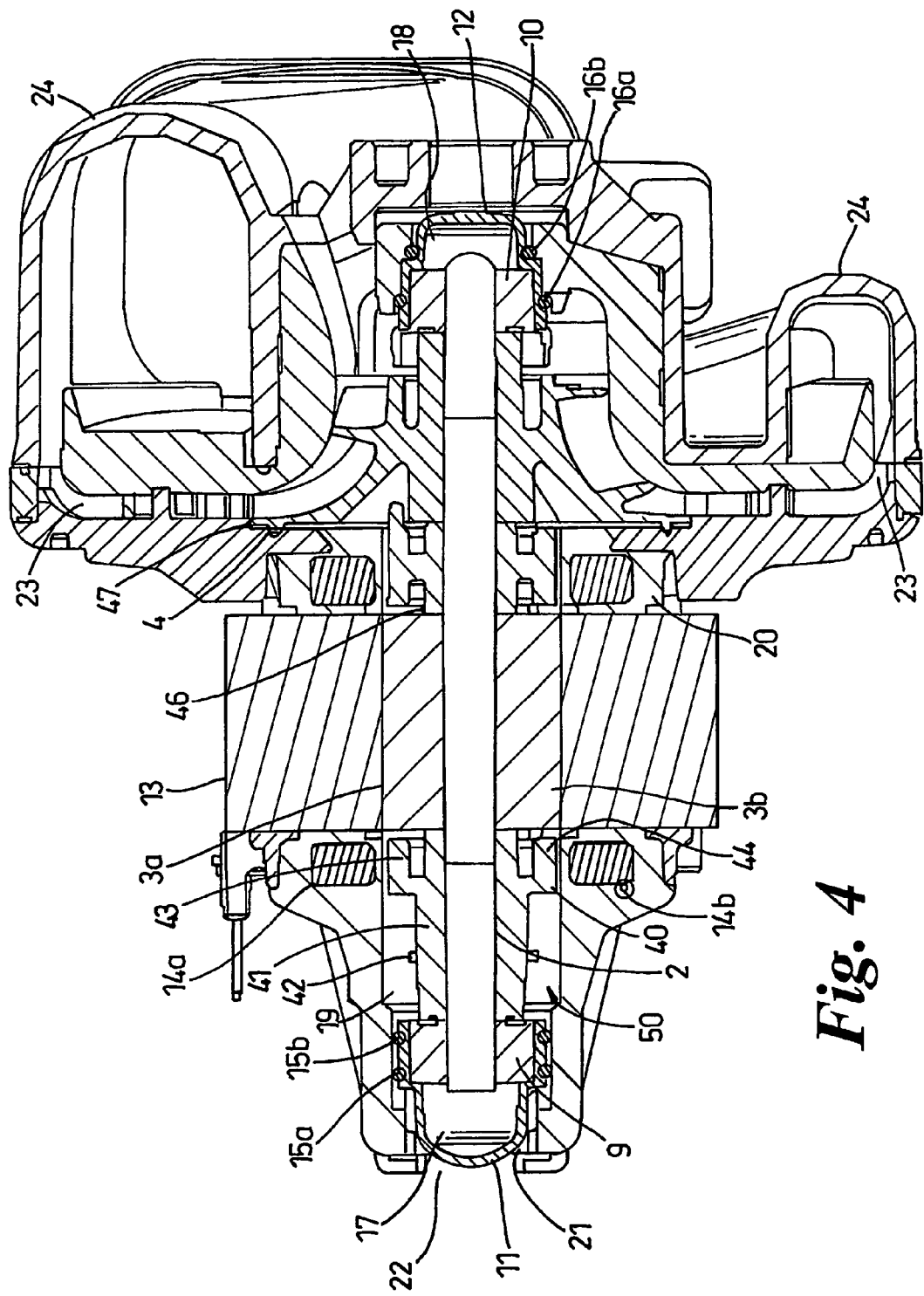
FIG. 4 is a sectional view of a motor incorporating the rotor assembly of FIGS. 1 to 3.

Bearing assemblies 7, 8 are provided on the shaft 2. Each bearing assembly 7, 8 comprises a bearing 9, 10 supported on the shaft 2 by a housing 11, 12. The bearings 9, 10 are arranged to press-fit onto the shaft and into their respective housings 11, 12. Each bearing 9, 10 comprises an inner race 9a, 9b, an outer race 10, 10b and a plurality of ball bearings (not shown) held between the races. The bearings 9,10 permit the rotor 3 to be rotatably supported in a stator 13, such as is shown in FIG. 4.

The stator 13 comprises a stack of steel laminations arranged to have four inwardly projecting salient poles. Two of the poles 13a, 13b, diametrically opposite each other, are shown in FIG. 4. Each pole supports a winding 14a, 14b which together form a first phase. The other diametrically opposite poles (not shown) similarly accommodate respective windings, which represent a second phase. Each winding 14 comprises a large number of turns (e.g. 50+ turns) of an insulated electrical conductor around the respective stator pole.

Each of the housings 11, 12 carries a pair of o-rings 15a, 15b and 16a, 16b. The o-rings of each pair are located at positions corresponding approximately to the end portions of the bearing within the respective housing. This soft mounting of the rotor assembly 1 against the stator assembly permits the rotor assembly 1 to find its own centre of rotation in use. Thus, the rotor assembly 1 rotates about its centre of mass, with little excursion, and so the clearance between the rotor poles and the stator can be made relatively small. The smaller the gap, the smaller the magnetic reluctance between the stator and the rotor and hence the more power that can be generated by the motor with a given electrical input. Thus, the efficiency of the machine is improved.

The bearing assemblies 7, 8 are located at the extreme end portions of the rotor shaft 2. This feature aids the balancing of the shaft 2, particularly at the high speeds experienced by the rotor assembly 1.

The housings 7, 8, for the bearings 9,10 are thermally conductive. Heat generated by the bearings 9, 10 is dissipated by the housings 7, 8. Thus, the rotor assembly can be rotated at very high speeds for prolonged periods without the bearings overheating.

The housings 7, 8 also contain respective reservoirs 17, 18 of fluid, such as grease, which are arranged to provide lubrication to the bearings 9, 10 in use. Typically, the ball bearings are coated with grease that, over time, gets pushed out of the races. The reservoirs 17, 18 of grease supply the ball bearings with lubrication throughout their lifetime.

If the mass of the rotor assembly 1 is unevenly distributed, the rotor assembly may wobble as it rotates, which can put strain on some of the components and subject them to uneven wear. Thus, the shaft 2 of the rotor assembly 1 also carries a balancing member in the form of a disk-shaped main body 40 on a sleeve 41. The disk 40 is formed of plastics material. The rotor assembly 1 may be placed in a balancing apparatus (not shown), in which the shaft 2 is arranged to spin. The balancing apparatus is arranged to detect imbalances of the rotor assembly 1. Tools are then employed, preferably under automatic control, to remove material from the balancing disk 40 by shaving, drilling or cutting. Material is removed from the disk 40 in order to balance the rotor assembly 1.

In accordance with the invention, the balancing member further comprises an integral encoder member. In this embodiment, the encoder member comprises a disk 42 having a plurality of apertures 48, 49. The encoder disk 42 is carried by the sleeve 41, and is axially displaced from the balancing disk 40.

The encoder disk 42 is located on the sleeve 41 in a predetermined position, which position includes a predetermined orientation. Thus, when the balancing member is introduced onto the shaft 2 and arranged to abut the rotor member 3, the encoder 42 automatically occupies a predetermined position and orientation with respect to the rotor member. In particular, the positions of the edges of the apertures 48, 49 with respect to the rotor poles are known. Hence, the position of the rotor member 3 can be determined accurately. Previously, the encoder member was introduced onto the shaft separately, and thus the relative position and orientation of the encoder and rotor poles had to be determined carefully before the rotor assembly could be used. Thus, the manufacture and set-up of the rotor assembly of the invention is more straightforward than hitherto.

To ensure that the balancing disk 40, and hence the encoder member 42, occupies a predetermined position, locating means is provided in the form of axially-projecting lugs 43, 44, which are arranged to engage the rotor member 3 in the region between the poles 3a, 3b of the rotor member. Hence the balancing member may simply be slotted into the desired position.

The balancing member, including the encoder disk 42, has a diameter smaller than that of the rotor member 3, which facilitates manufacture of the rotor assembly. During manufacture, the components of the rotor assembly are assembled on the shaft, and the entire rotor assembly is simply slotted into the aperture 19 provided for the rotor member 3, with the housing 11 abutting the end cap 21. Previously, the individual components of the rotor assembly were balanced separately before being incorporated into the motor or generator, which produced a less than ideal balance condition of the completed rotor assembly. However, the rotor assembly of the present invention may be completed before final assembly of the motor. Thus, the complete rotor assembly may be balanced in one operation by means of the balancing member, as described above.

The rotor assembly 1 further comprises a second balancing member 45, located adjacent the other end portion of the rotor member 3. The second balancing member 45 has a set 46 of lugs arranged to project into the region between the poles 3a, 3b of the rotor member 3. A further set 47 of lugs is provided and arranged to engage in apertures in the impeller 4. The provision of balancing members 40, 45 at both ends of the rotor member 3 helps to support the laminations of the rotor member.

The encoder disk 42, or chopper, is associated with position detecting means, indicated generally in FIG. 4 by the reference numeral 50. The position detecting means 50 comprises a source of optical radiation and an optical sensor. The encoding disk 42 is positioned between the source and detector, the plane of the disk being substantially perpendicular to the direction of optical radiation. The apertures 48, 49 allow light from the source to be transmitted to the sensor. As the encoder disk 42 rotates with the shaft 2 of the rotor assembly 1, light from the source is interrupted intermittently. Thus, the optical sensor receives a pulsed light signal. Signals from the optical sensor are transmitted to a controller (not shown).

The controller is electrically connected to the drive circuit, to which the windings 14a, 14b on each of the stator pole portions 13a, 13b are connected. Torque is produced by switching current on in each phase winding in a sequence, so that a magnetic force of attraction results between the rotor and stator poles that are approaching each other. The current is switched off in each phase before the rotor poles nearest the stator poles of that phase rotate past the aligned position. Thus, knowledge of the rotational position of the rotor poles is essential.

The impeller 4 rotates with the rotor shaft 2 and thus draws air into the motor. The bearing assembly 8 forms a nose cone located at the end of the shaft 2, upstream of the impeller 4. Hence, air being drawn in by the impeller 4 will firstly flow over the bearing assembly 8. Heat generated by the bearing 10 is dissipated by the thermally conductive bearing housing 12. The airflow over the bearing assembly 8 serves to cool the bearing housing 12.

There is also provided an inlet 22 for a second airflow for the bearing assembly 7 at the other end of the shaft. Heat generated by the bearing 9 is dissipated by the thermally conductive housing 11, which is cooled by the flow of air from the inlet 22.

The stator 13 and windings 14 are encapsulated by plastics material 20 by means of an injection-moulding process, by which plastic granules are melted, then injected into a mould cavity under pressure to create the required shape. During this process, the aperture 19 for the rotor assembly 1 and an end cap 21 for receiving one of the bearing housings 11 are formed simultaneously.

Figure 5:
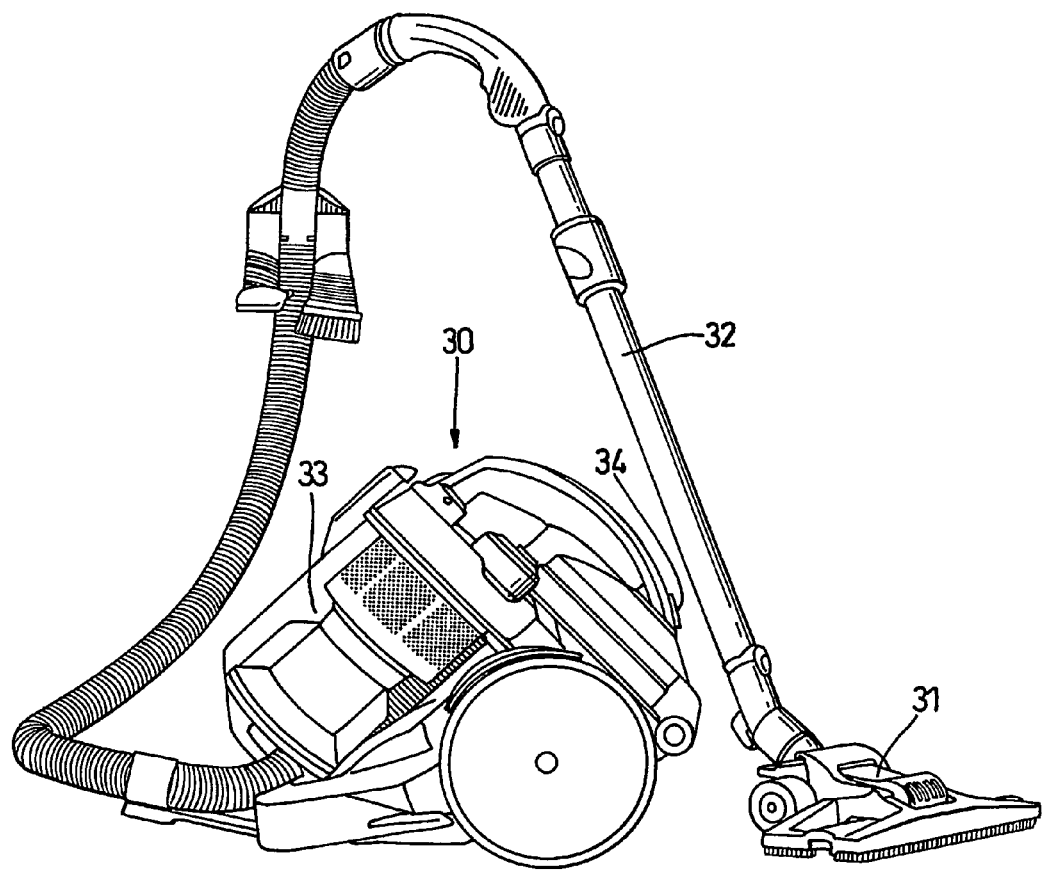
FIG. 5 is a side view of a vacuum cleaner incorporating the motor of FIG. 4; and Like reference numerals refer to like parts throughout the specification.

FIG. 5 shows one example of a vacuum cleaner 30 in which the motor may be used. The motor-driven impeller 4 draws dirty air into the cleaner 30 via a nozzle 31 and a hose and wand assembly 32. The dirty air enters a separator 33, which serves to separate dirt and dust from the dirty air. The separator 33 can be a cyclonic separator, as shown here, or some other separator, such as a dust bag. Cleaned air leaves the separator 33 before entering the motor housing located within the main body 34 of the cleaner. A pre-motor filter is typically placed in the airflow path before the impeller to filter any fine dust particles that were not separated by separator 33.

In use, the motor rotates the impeller 4 at a very high speed (of around 100,000 rpm). The pumping action of the impeller 4 draws air through the cleaner. The air then flows over the bearing housings and is redirected by the impeller blades 5 through diffusion outlets 23 into the scroll 24.

A post-motor filter may be placed in the airflow path after the scroll 24. However, the provision of a brushless motor reduces the requirement for such a filter. The cleaned air is then exhausted from the cleaner to the atmosphere via a suitable outlet.

Variations to the described embodiments will be apparent to a skilled person and are intended to fall within the scope of the invention. For example, while a four-pole stator, two-pole rotor machine has been described, the invention can be equally applied to machines having other numbers of poles on its stator and rotor and with motors having other dimensions.

Although the balancing member and integral disk have been described as being of plastics material, it will be appreciated that any non-magnetic material may be used.

The lugs employed to fix the balancing member in a predetermined location on the shaft may be replaced with other locating means. For example, grooves may be provided to co-operate with lugs on the rotor and/or the shaft.

The rotor assembly of the invention is equally applicable to motors and generators, not necessarily of the switched reluctance type, and may be employed in appliances other than domestic vacuum cleaners, such as lawn mowers, air conditioners, hand dryers and water pumps.

The invention claimed is:

1. A rotor assembly comprising a shaft carrying a rotor and a balancing member from which material is selectively removable, the balancing member being located in a predetermined position with respect to the rotor and comprising a main body from which material is selectively removable, a sleeve and an encoder member disposed on the sleeve so as to provide a separation between the main body and the encoder member in an axial direction of the shaft.

2. A rotor assembly as claimed in claim 1, wherein the rotor has a plurality of poles and the balancing member has at least one lug located between adjacent poles.

3. A rotor assembly as claimed in claim 1 or 2, wherein the encoder member comprises a disk having at least one aperture.

4. A rotor assembly as claimed in claim 1, wherein the main body is located adjacent one end portion of the rotor.

5. A rotor assembly as claimed in claim 4, further comprising a second balancing member located adjacent the other end portion of the rotor.

6. A rotor assembly as claimed in claim 1 or 2, wherein each balancing member is made of a plastic material.

7. An electrical machine comprising the rotor assembly as claimed in claim 1 or 2.

8. An electrical machine as claimed in claim 7, further comprising a stator in which the rotor assembly is arranged to rotate, a light source and an optical detector, the encoder member being arranged to interrupt intermittently light between the source and detector as the rotor assembly rotates.

9. An electrical machine as claimed in claim 8, further comprising electrical windings on the stator and a controller arranged to energize the windings in dependence on signals from the detector.

10. An electrical machine as claimed in claim 9 in the form of a high-speed motor.

11. A cleaning appliance comprising the electrical machine as claimed in claim 9.

12. A balancing member for a rotor assembly comprising a main body from which material is selectively removable, a sleeve, an encoder member formed integrally with the balancing member and disposed on the sleeve so as to provide a separation between the main body and the encoder member in an axial direction of the shaft, and a locating device arranged to locate the balancing member on a shaft in a predetermined position with respect to a rotor.

13. A balancing member as claimed in claim 12, wherein the locating device comprises a lug arranged to locate in a region between rotor poles.

14. A method of manufacture of a rotor assembly comprising:
   assembling a rotor on a shaft,
   introducing a balancing member onto the shaft, the balancing member comprising a main body, a sleeve and an encoder member disposed on the sleeve so as to provide a separation between the main body and the encoder member in an axial direction of the shaft and integrally formed with the balancing member onto the shaft,
   arranging the balancing member to occupy a predetermined position with respect to the rotor, and
   selectively removing material from the balancing member in order to balance the rotor assembly.

15. A rotor assembly as claimed in claim 1 or 2, wherein the encoder member is formed integrally with the balancing member as one piece.

16. An electrical machine as claimed in claim 15 in the form of a high-speed motor.

17. A cleaning appliance comprising the electrical machine as claimed in claim 16.

18. A rotor assembly as claimed in claim 1, wherein the main body comprises a ring in which the shaft is inserted.

* * * * *